United States Patent
Tracy et al.

(10) Patent No.: US 9,788,291 B1
(45) Date of Patent: Oct. 10, 2017

(54) METHOD FOR SHARING SATELLITE POSITIONING SYSTEM INFORMATION AMONG NEARBY BASE STATIONS

(71) Applicant: Sprint Spectrum L.P., Overland Park, KS (US)

(72) Inventors: Paul Tracy, St Charles, MO (US); Muralidhar Malreddy, Overland Park, KS (US); Julio C. Costa, Tampa, FL (US); Ryan S. Talley, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 372 days.

(21) Appl. No.: 14/535,016

(22) Filed: Nov. 6, 2014

(51) Int. Cl.
*H04W 56/00* (2009.01)
*H04W 72/04* (2009.01)
*H04W 24/08* (2009.01)

(52) U.S. Cl.
CPC ....... *H04W 56/0015* (2013.01); *H04W 24/08* (2013.01); *H04W 72/0426* (2013.01)

(58) Field of Classification Search
CPC ............. H04W 56/0015; H04W 24/08; H04W 72/0426
See application file for complete search history.

(56) References Cited

U.S. PATENT DOCUMENTS

| 9,137,767 | B1* | 9/2015 | Guthrie | ................. H04W 40/02 |
| 2012/0231807 | A1* | 9/2012 | Kong | ................. H04W 56/0035 |
| | | | | 455/456.1 |
| 2013/0012197 | A1* | 1/2013 | Diab | ..................... H04J 3/0641 |
| | | | | 455/426.1 |

* cited by examiner

Primary Examiner — Melvin Marcelo (57) ABSTRACT

A method for dynamically selecting one of a plurality of base stations for provision of timing information. A base station compares satellite signal strengths measured at satellite-positioning-system receivers of a plurality of base stations, such as the plurality of base stations in a local area network (LAN) for instance. The base station then selects one of the plurality of base stations to provide timing information based at least in part on the comparison, such as the one base station having the greatest satellite signal strength for instance. The base station then operates according to timing information indicated by satellite data from the selected base station. Advantageously, this method can help to increase the accuracy and reliability of the timing information.

20 Claims, 6 Drawing Sheets

METHOD FOR SHARING SATELLITE POSITIONING SYSTEM INFORMATION AMONG NEARBY BASE STATIONS

BACKGROUND

Unless otherwise indicated herein, the description provided in this section is not prior art to the claims and is not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

Regardless of whether it is configured to support one cell, multiple cells, or multiple sectors, a base station is typically deployed to provide coverage over a geographical area on a scale of a few to several square miles and possibly for tens to hundreds to several thousands (or more) of subscribers at any one time. On this scale, coverage is referred to as "macro-network coverage" and the base station is referred to as a "macro-type base station."

More recently, a type of base station aimed at coverage over a much smaller physical area and at concurrent support of fewer subscribers has been introduced. Referred to generically herein as a "micro-type base station," this device can be used to fill in local coverage gaps in macro-network coverage, or to provide localized small-area coverage where no macro-network coverage exists. When deployed as an integral component of the network infrastructure, a micro-type base station is also referred to as a "picocell."

Service providers have also begun offering even smaller micro-type base stations as consumer devices that are referred to as "femtocells" or "small cells." Femtocells can similarly fill in gaps in macro-network coverage. Femtocells can typically be comparable in size to desktop phones or other portable user devices. In a usual case, femtocells can provide limited and exclusive coverage to individual subscribers within small-scale spaces. Instead of connecting as an integral component of the network infrastructure, a femtocell communicates with the service provider's network via one or another form of broadband connection associated with or available to the consumer-owner (or renter) of the femtocell, for example, from an internet service provider (ISP).

A micro-type base station can be a low-power, low-capacity version of a macro-type base station, typically plugging into a residential power outlet, perhaps with a transformer providing a DC power supply. The micro-type base station may have a wired or wireless connection with a network router, and would thus have connectivity to the Internet and/or one or more other packet-data networks via a user's broadband connection.

The small form factor of a micro-type base station makes it deployable in a portable fashion. As such, the micro-type base station may not be as reliably fixed to a particular geographic location as a macro-type base station, which is typically deployed as part of the network infrastructure. In order to determine the micro-type base station's geographic location, the micro-type base station can be equipped with a satellite-positioning-system (SPS) receiver (e.g., a Global Positioning System (GPS) receiver) for use in receiving and decoding SPS signals. The micro-type base station can also use timing information embedded in SPS signals for synchronizing operations with other micro-type base stations and with the macro network.

A base station may rely on the location information for various operations. As an example of a location-dependent operation, the base station may use the location to receive authorization from the cellular wireless network to operate in that location. As another example location-dependent operation, the base station may acquire one or more operating parameters such as a traffic-bearing carrier frequency (i.e., a carrier) among others.

Similarly, a base station may rely on the timing information to perform some operations. By way of example, data communications between a UE and other entities of the cellular wireless network via the base station may be formatted as timed data frames. To reduce errors in such data transmissions, the data frames can be synchronized to a highly-accurate and stable reference time signal. Satellite signals received by the SPS receiver may provide such reference time signal. The timing information associated with the satellite signals may therefore facilitate synchronized communication between the base station and other entities in the cellular wireless network and beyond.

OVERVIEW

Relying on an SPS signal can present a problem for a base station, as acquiring an SPS signal typically requires a line-of-sight view of one or more SPS satellites, which is not available in many locations. For instance, a micro-type base station may be deployed in a location that does not receive sufficient SPS reception or that receives a low satellite signal strength, such as in a basement, a high-rise building, a multiple-dwelling unit, an office building, or any other location where the micro-type base station similarly does not receive sufficient SPS reception. Moreover, in some instances, a micro-type base station may not be equipped with an SPS receiver, or may be equipped with a low quality SPS receiver.

In some scenarios, multiple base stations may be deployed within a small geographic area. For instance, an office building may include multiple base stations deployed in various parts of the office building and connected to one another via a local area network (LAN). Some of the multiple base stations, such as those near windows, may have higher satellite signal strengths than others, such as those in a basement of the office building. In this instance, although all the base stations may have similar actual locations and actual timing information, the base stations with higher satellite signal strengths may be able to compute more accurate and reliable location and timing information than the other base stations with lower satellite signal strengths.

Disclosed herein is a method and corresponding system for sharing satellite data between nearby base stations. In particular, a base station may compare satellite signal strengths of a group of base stations, and may then select one of the base stations for provision of satellite data. In various embodiments herein, the group may include the base station and nearby base stations, or may alternatively include only the nearby base stations among other possibilities. The base station may then operate according to timing information, geographic location, or both as indicated by an SPS receiver of the selected base station. Thus, the selected base station may act as a "master" cell that provides the satellite data, and the other base stations in the group may act as "slave" cells that receive or utilize the satellite data from the master cell. The selection may depend primarily on the comparison of the satellite signal strengths, such as selecting the base station having the greatest satellite signal strength. Additionally or alternatively, other criteria may affect the selection, such as quality of connectivity between the base station and the selected base station, a particular selection by a user of the base station or by the wireless communication network, or any other criteria. Through this process, the base station may improve accuracy and reliability of the timing information or the geographic location.

Thus, in one respect, a method is disclosed, that may be implemented by a base station associated with a cellular wireless communication system, or by another type of communication system. The method may involve a first base station determining respective satellite signal strengths at a plurality of base stations. Each satellite signal strength may be measured at a satellite-positioning-system receiver of a respective one of the plurality of base stations. And the method may then involve the first base station performing a comparison of the satellite signal strengths at the plurality of base stations. Further, the method may also involve selecting one of the plurality of base stations to provide timing information based at least in part on the comparison. And the method may then involve the first base station operating according to the timing information indicated by the satellite-positioning-system-receiver of the selected base station.

In another respect, a method is disclosed that may involve a base station determining configuration data. The configuration data may indicate selection of the base station for provision of timing information to operate a plurality of base stations. The selection may be based on a comparison of satellite signal strengths of the plurality of base stations. Each satellite's signal strength may be measured at a respective satellite-positioning-system receiver of a respective one of the plurality of base stations. And the method may also involve determining the timing information based on satellite data from a satellite-positioning-system receiver of the base station. Further, the method may also involve providing one or more data streams that include the timing information to one or more base stations of the plurality of base stations. And the method may also involve the base station operating according to the timing information indicated by the satellite-positioning-system receiver of the base station.

Still further, in another respect, a method is disclosed that may involve a second base station receiving a message indicating selection of a first base station for provision of timing information to operate the second base station. The selection may be based on a comparison of satellite signal strengths at a plurality of base stations. Each satellite signal strength may be measured at a respective satellite-positioning-system receiver of a respective one of the plurality of base stations. The method may also involve determining quality of connectivity between the first base station and the second base station. The method may also involve the base station operating according to the timing information indicated by satellite data from: (i) the first base station if the quality is greater than a threshold, or (ii) the second base station if the quality is less than the threshold.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

As noted above, FIG. 1 is a block diagram of a cellular wireless communication system according to an embodiment of the present disclosure. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
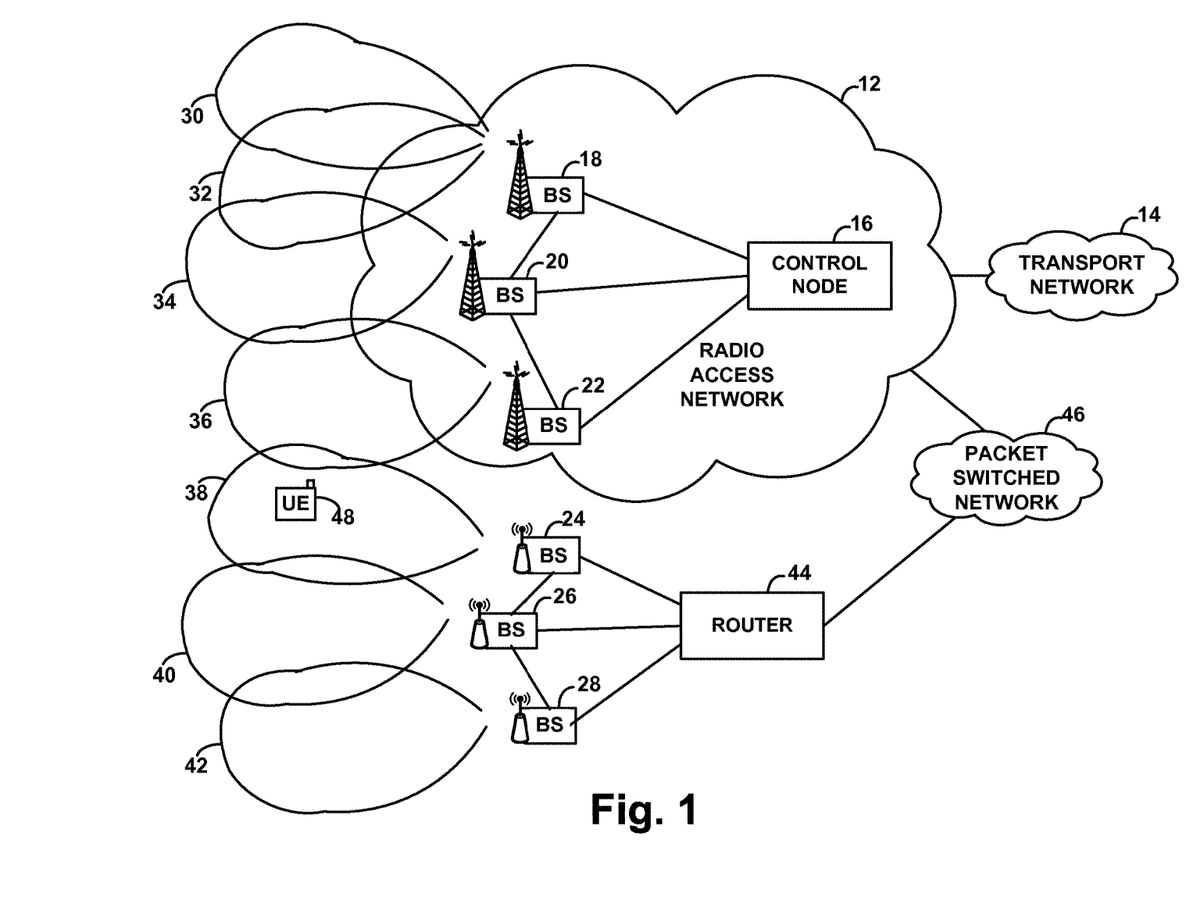
FIG. 1 is a block diagram of a cellular wireless communication system in which embodiments of the present disclosure can be implemented.

The cellular wireless system in FIG. 1 includes a radio access network (RAN) 12, which functions to provide UEs with cellular communication service, such as connectivity with a transport network 14 for instance. In general, the RAN 12 includes a control node 16 and multiple base stations (e.g., eNodeBs), three examples of which 18, 20, 22 are shown in FIG. 1. These and other components may be owned and/or operated by or for a telecommunications service provider such as a cellular wireless carrier and may physically sit as nodes on a core packet network operated by the service provider. Additionally, other base stations may physically sit outside the core packet network operated by the service provider, three examples of which 24, 26, 28 are shown in FIG. 1. The base stations 24, 26, 28 may provide coverage in areas that are not covered by the base stations 18, 20, 22. For instance, the base stations 24, 26, 28 may be small cells or femtocells deployed in small spaces that are not covered by the base stations 18, 20, 22. The base stations 24, 26, 28 may connect to the RAN 12 using a broadband connection through router 44 and packet switched network 46. Communications over the various illustrated interfaces may then pass between various network entities as packet-based communications, such as Internet Protocol (IP) communications for instance, through the core network.

In practice, each base station may include transceiver equipment and antennas (e.g., on an antenna tower) arranged to define one or more cellular wireless coverage areas such as a cell and cell sectors. For instance, base station 18 is shown radiating to define representative coverage areas 30, 32, base station 20 is shown radiating to define a representative coverage area 34, and base station 22 is shown radiating to define a representative coverage area 36. Similarly, for instance, base station 24 is shown radiating to define a representative coverage area 38, base station 26 is shown radiating representative coverage area 40, and base station 28 is shown radiating representative coverage area 42. Shown operating within coverage area 38 is then a representative UE 48, which can be any type of wireless communication device capable of engaging in air interface communication with the base stations. The base stations and the UE 48 may be configured to communicate with each other according to any of a variety of air interface protocols, examples of which include Orthogonal Frequency Division Multiple Access (OFDMA) (e.g., Long Term Evolution (LTE) or Wireless Interoperability for Microwave Access (WiMAX)), Code Division Multiple Access (CDMA), Global System for Mobile Communications (GSM), and others now known or later developed.

The network router 44 may provide connectivity for the base stations 24, 26, 28 (e.g., through one or more nodes such as a cable modem, DSL modem, or the like) with the broadband packet switched network 46 (e.g., the Internet). For instance, the base stations 24, 26, 28 may connect to the router 44 using a wired (e.g., Ethernet) or wireless (e.g., WiFi) interface. Alternatively, each of the base stations 24, 26, 28 may connect to the packet switched network 46 using a separate router. In turn, various network entities coupled to or present in the RAN 12, such as virtual private network terminators (VPN-T) or base station controllers (BSCs), may authenticate and authorize access for the base stations 24, 26, 28 to the RAN 12. Depending on implementation, the packet switched network 46 and the transport network 14 may be separate networks or may be the same network.

Control node 16 may function to manage certain aspects of the RAN operation, such as certain base station functions and features of air interface communication. As such, the control node can take various forms, depending on the type of RAN at issue. For instance, in an LTE network, the control node can be a mobility management entity (MME), whereas in a CDMA network, the control node can be a mobile switching center (MSC). Other examples are possible as well.

In line with the discussion above, some or all base stations in a cellular wireless network such as that shown in FIG. 1 may require geographic location and timing information for various operations. Optimally, a base station may determine the location and timing information with high accuracy using a local satellite-positioning-system (SPS) receiver that receives satellite signals from overhead satellites. However, the accuracy and reliability in this arrangement may depend on the satellite signal strength at the SPS receiver, which in turn depends on the existence or lack thereof of various objects along the line-of-sight between the SPS receiver and the overhead satellites. Further, some base stations may not include an SPS receiver or may include a poor quality SPS receiver. Thus, dynamic conditions of a base station that relies on SPS signals may affect the various operations of the base station.

For instance, a UE served by a base station may be communicating a stream of data packets, such as voice, data, or video with a transport network. The transmission of the data packets may be timed using timing information from the SPS receiver of the base station. The UE may travel towards a coverage area of another neighboring base station, and thus the base station may handover the UE's communication to the neighboring base station. The neighboring base station may resume streaming the data packets by using a common timing reference signal with the base station. Such common timing reference signal may be obtained via an SPS receiver of the neighboring base station. Advantageously, the UE may continue to communicate the data packets synchronously.

Further, the neighboring base station may determine available carrier frequencies at the location of the neighboring base station, and thereby instruct the UE to use the available carrier frequencies. If the location or timing information at either base station is inaccurate, the quality of the operations described above may be affected. For instance, the UE may experience errors or delays in the data packet stream.

Considering the arrangement of FIG. 1 by way of example, if UE 48 is served in coverage area 38 by base station 24 and the UE begins to move into coverage area 40 of base station 26, the UE may detect a signal from base station 26 and may send to serving base station 24 a report indicating detection of base station 26. The UE may provide this report for various reasons, such as in response to having detected threshold poor signal strength from serving base station 24 and threshold high signal strength from base station 26, or as a periodic measurement report. While the UE is in the coverage area 38 of the base station 24, the UE may be engaged in transmitting a sequence of voice data packets to the RAN 12 that are synchronized with a timing signal of an SPS receiver in the base station 24.

In the event the report from the UE was appropriate to trigger handover of the UE from being served by base station 24 to being served by base station 26, base station 24 may transmit a handover request message to the base station 26. Upon receipt of the handover request, base station 26 may reserve resources to serve the UE. For instance, base station 26 may determine its location by utilizing satellite data from its local SPS receiver, provide the location to the RAN 12, and thereby receive an indication of available carrier frequencies or other operational parameters from the RAN 12. In turn, the base station 26 may inform base station 24 that handover is ready, and provide the operational parameters (e.g., carrier frequencies) to the base station 24. The base station 24 may then signal to the UE to direct the UE to transition to being served by base station 26 according to the operational parameters of base station 26. In turn, the UE may resume transmitting the voice packets through base station 26 instead of base station 24. Further, base station 26 may determine its timing information similarly by utilizing satellite data from its local SPS receiver. The base station 26 may determine the location and timing information in response to receiving the handover request from base station 24, or may alternatively determine the location and timing information at another time (e.g., continuously, in response to powering on the base station 26, in response to receiving a command, or in response to any other predetermined event). The base station 26 may then resume sending the voice packets to the RAN 12 by utilizing the determined timing information.

However, if the timing information of base station 26 is significantly different from the timing information of base station 24, the transition of the voice packet stream may be inaccurate. For instance, if there is a lag between the timing signals of the two base stations, the voice stream from the UE may appear to have gaps or jitters, or some voice packets may be skipped. Such discrepancy in timing information may be due to the quality of satellite signals received by respective SPS receivers of the two base stations.

In practice, multiple base stations may be deployed within a small geographic region. A good example of this may occur in a scenario where a group of base stations, such as small cells or the like, are deployed in various parts of a building. In that scenario, the base stations may have similar actual location and timing information due to their proximity within the small geographic region. Yet the location and timing information computed by each base station may vary due to varying satellite signal strengths of respective SPS receivers of the base stations. For instance, some base stations that are deployed near windows or in upper floors of the building may have stronger satellite signal strengths than other base stations that are deployed near the center of the building or in lower levels of the building.

Furthermore, in some instances, the satellite signal strength of a base station may vary as dynamic conditions surrounding the base station change. One instance may include particular furniture moved around the base station that may interfere with its SPS receiver and thereby change its satellite signal strength. Another instance may include a large metal bridge next to the building that is lifted at different times during the day which interferes with the line-of-sight of the SPS receiver in the base station when the bridge is lifted. Other instances are possible as well.

The present method may advantageously help to increase the accuracy and the reliability of timing or location computations in arrangements like this, by selecting a base station for provision of satellite data to other nearby base stations that have lower satellite signal strengths. More particularly, the method may involve a base station comparing satellite signal strengths associated with a group of base stations, then selecting one of the group to provide satellite data (or timing/location information computed based on the satellite data) based at least in part on the comparison, and then the base station operating according to the location or the timing information indicated by the satellite data from the selected base station.

In the example above, this may involve determining respective satellite signal strengths of the group of base stations, comparing the satellite signal strengths, and thereby determining that a particular base station of the group has the greatest satellite signal strength. In turn, the method may then involve selecting the particular base station as a "master" cell that provides its satellite data to the other base stations (e.g., "slave" cells) in the group. Or the selected base station may compute timing information, location information, or both, using the satellite data from its local SPS receiver, and then provide the computed information to the other base stations (i.e., the "slave" cells). In turn, the other base stations may operate according to the satellite data of the selected base station that has the greatest satellite signal strength.

Continuing with the example above, on one hand, if the selected base station is the base station itself, the method may then involve the base station sending a message to the other base stations in the group identifying the base station as the selected base station for provision of the satellite data. And the method may also involve the base station establishing one or more data streams that include the satellite data (or the computed information) to the other base stations. On the other hand, if the selected base station is another base station in the group, the method may alternatively involve the base station sending a request to the selected base station for its satellite data. In turn, the selected base station may then establish a data stream to the base station that includes the satellite data (or the computed information) from an SPS receiver of the selected base station. Further, the selected base station may similarly establish one or more data streams to other base stations in the group.

In practice, comparing the satellite signal strengths and selecting a base station from a group of base stations in accordance with the present disclosure may be performed by any or each base station of the group of base stations. Advantageously, this may allow each base station to select the most suitable base station for provision of satellite data according to its dynamic conditions. For instance, some base stations of a given group of base stations may also be included in one or more other groups of base stations that are not near or are not accessible to other base stations of the given group, and base stations of the one or more other groups may have even greater satellite signal strengths than the greatest satellite signal strength in the given group. Or, for instance, some base stations within the given group may be unable to connect reliably to the selected base station due to varying network conditions, and may thus select a different base station for provision of their satellite data. Other scenarios are possible as well.

Alternatively, the comparison and the selection may be performed by a pre-determined base station of the group of base stations. For instance, continuing with the example above, the base station may obtain configuration data that identifies it for performing the comparison, and may thereby perform the method of the present disclosure. In this instance, for example, a user of the base station or an operator of the cellular wireless network may select the base station that performs the comparison, and identify the base station in the configuration data. Thus, the base station performing the comparison may be a first "master" cell, the selected base station providing the satellite data (or timing/location information) may be a second "master" cell, and the base stations receiving the satellite data may be "slave" cells. On one hand, if the selected base station is also the base station performing the comparison, then the selected base station may be both the first master cell and the second master cell. On the other hand, if the base station performing the comparison is not the selected base station, then the base station performing the comparison can be both the first master cell and a slave cell.

In any case, by performing the comparison and the selection, the base station may facilitate operation of some or all of the group of base stations according to satellite data from another nearby base station in the group that has a better satellite signal strength, and may thus improve accuracy and reliability of the timing information or the location information utilized by a respective base station in the group.

Further, the method can be enhanced to help identify nearby base stations that have SPS receivers. In practice, for instance, a group of nearby base stations may be connected to one another via a router in a local area network (LAN). Continuing with the example above, in this instance, the method may thus involve the base station receiving a listing of the group of base stations from the router. And the method may then involve the base station sending a request for an indication of the satellite signal strengths to one or more of the group of base stations indicated by the listing from the router, and thereby performing the comparison of the satellite signal strengths to select one of the group of base stations for provision of the satellite data (or timing/location information). Continuing with the arrangement of FIG. 1 by way of example, the base stations 24, 26, 28 may be connected to one another via a wired (e.g., Ethernet) or wireless (e.g., WiFi) connection to the router 44 that defines the LAN.

Alternatively, the base station may detect nearby base stations using a wireless communication interface in the base station, even if the nearby base stations are not connected to a common router. For instance, in the example above, the method may involve the base station detecting one or more of the group of base stations via a wireless communication interface in the base station. And the method may then involve sending a request for an indication of the satellite signal strengths to the detected base stations, and thereby performing the comparison of the satellite signal strengths to select one of the group of base stations for provision of the satellite data (or the timing/location information). By way of example, the base station may detect nearby base stations that are broadcasting wireless signals (e.g., WiFi, Bluetooth, etc.) having wireless signal strengths greater than a particular threshold, and may thereby identify those base stations for inclusion in the group of base stations.

Still further, the method can be enhanced to select the particular base station for provision of the satellite data not just based on the comparison of satellite signal strengths, but perhaps also based on quality of connectivity between the base station and the selected base station. For instance, in the example above, if there are eight base stations A, B, C, D, E, F, G, H in the group, it may be the case that those eight base stations have satellite signal strengths in the order A, B, C, D, E, F, G, H, with A being the greatest satellite signal strength and H being the lowest satellite signal strength. Given a determination that A has the greatest satellite signal strength, the method may involve detecting whether or not quality of connectivity between A and G is less than a threshold. The quality of connectivity may be a metric such as data stream quality, ping, jitter, LAN connectivity, or any other quality metric. In response to detecting that the quality is less than the threshold, the method may then involve selecting base station B instead of base station A for provision of satellite data (or timing/location information) to base station G, on grounds that the quality of the connectivity between A and G is not suitable for base station G to receive the satellite data reliably from base station A anyway. Or, alternatively, the method may involve G using satellite data from its local SPS receiver instead of the satellite data from A if the quality is less than the threshold.

Yet further, the method can also be enhanced to update the selection of the particular base station for provision of the satellite data according to dynamic conditions of the group of base stations. For instance, as a variation on the example above, consider scenarios where additional base stations are added to the group, existing base stations are removed from the group, a given base station of the group is deployed in a new position within the building, environmental conditions of the given base station (e.g., surrounding objects) change, LAN traffic fluctuates, or any other scenario that affects the satellite signal strengths of the group of base stations or the quality of connectivity between the group of base stations.

In these scenarios, a previously selected base station may no longer be the best base station for provision of the satellite data. To account for these scenarios, in some instances, the method may also involve re-determining the satellite signal strengths, determining whether or not there is a difference between at least one of the re-determined satellite signal strengths and a corresponding previously-determined satellite signal strength, and performing (or re-performing) the comparison in response to determining that there is a difference between at least one of the re-determined satellite signal strength and the corresponding previously-determined satellite signal strength.

In practice, the method may involve the base station periodically re-determining the satellite signal strengths by periodically sending messages to the group of base stations requesting an indication of the satellite signal strengths, and responsively receiving the indication. Alternatively, the group of base stations may periodically broadcast their satellite signal strengths, or may broadcast their satellite signal strengths in response to detecting a change in their respective satellite signal strengths. In this case, the method may involve the base station performing the comparison in response to receiving the satellite signal strengths from one or more of the group of base stations. Furthermore, alternatively or additionally, the method may involve performing the comparison in response to determining that there is at least a threshold difference between at least one of the re-determined satellite signal strengths and the corresponding previously-determined satellite signal strength.

Figure 2:
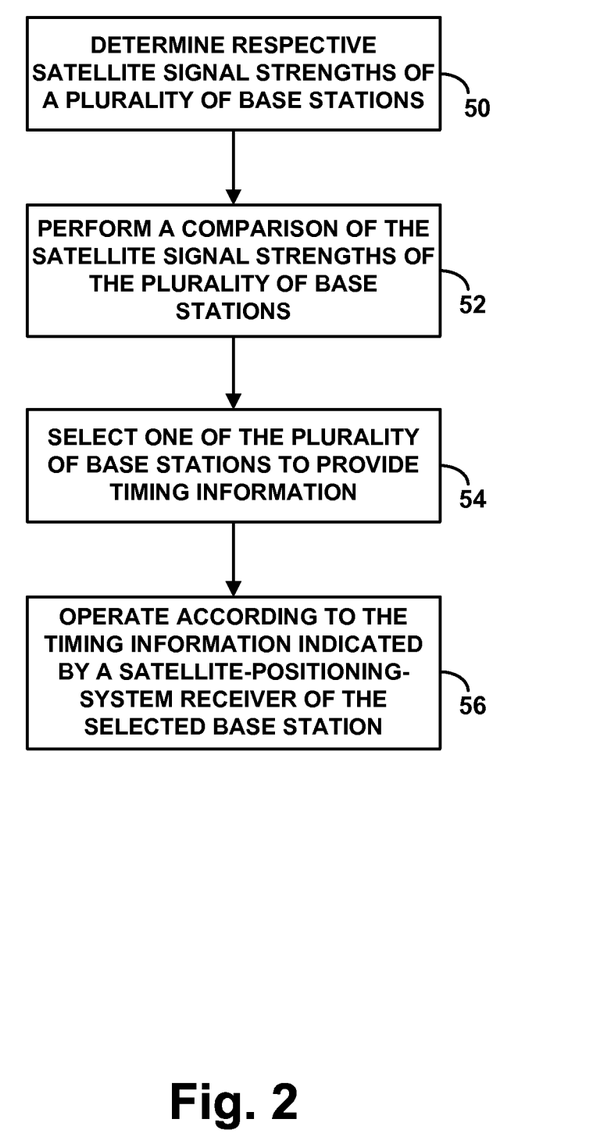
FIG. 2 is a flow chart depicting functions that can be carried out in accordance with the disclosure.

FIG. 2 is a flow chart depicting example functions of a method that can be carried out in accordance with the present disclosure. The functions of this method may be carried out by one or more entities, such as the base station 24 possibly in cooperation with the control node 16 and/or any other server but are described here as being carried out by a base station. Further, although this flow chart depicts the functions in a particular sequence, note that various depicted functions may occur concurrently with each other or perhaps in an order different from that shown.

As shown in FIG. 2, at block 50, a base station determines respective satellite signal strengths of a plurality of base stations. For instance, in the arrangement of FIG. 1, base station 24 may receive satellite signal strengths of base stations 26 and 28. In line with the discussion above, a base station may include a satellite-positioning system receiver, such as a Global Positioning System receiver (GPS receiver). Further, the plurality of base stations may also include the base station or may only include other nearby base stations. For instance, the method may also involve the base station detecting a satellite signal strength of its own SPS receiver. Further, the respective satellite signal strengths of the plurality of base stations may be measured at respective SPS receivers of the plurality of base stations. For instance, each SPS receiver of a respective base station of the plurality of base stations may measure its own satellite signal strength, and the respective base station may then provide an indication of the corresponding satellite signal strength to the base station.

In line with the discussion above, the plurality of base stations may be femtocells that are connected to one another via a local area network (LAN). For instance, the femtocells may be connected to one another via a network router such as the router 44 of FIG. 1. In turn, the plurality of base stations may have similar location or timing information due to their proximity. Further, the plurality of base stations may be able to communicate with one another via the router with little delay. In these cases, the method may involve the base station receiving a listing of one or more other base stations of the plurality of base stations that are also connected to the network router. Moreover, the method may also involve sending a request to the one or more other base stations for the indication of respective satellite signal strengths. In turn, the base station may receive the indication of the satellite signal strengths in response to sending the request.

Alternatively or additionally, the base station may include a wireless communication interface (e.g., WiFi, Bluetooth, etc.). In this case, the method may also involve detecting the one or more other base stations via the wireless communication interface, and responsively sending the request for the indication of the respective satellite signal strengths. For instance, the base station may identify the one or more base stations that have wireless signals (e.g., WiFi, Bluetooth, etc.) with wireless signal strengths greater than a particular threshold, and may include those base stations in the plurality of base stations.

At block 52, the base station performs a comparison of the satellite signal strengths of the plurality of base stations. As an example in the context of FIG. 1, base station 24 may receive satellite signal strengths of base stations 26, 28, and then compare the satellite signal strengths to identify the base station having the greatest satellite signal strength, or to determine a ranking of the satellite signal strengths.

In line with the discussion above, the method may also involve periodically re-determining the satellite signal strengths. For instance, the base station may periodically send a message to the plurality of base stations requesting an indication of their satellite signal strengths. In turn, the base station may perform the comparison in response to detecting a difference between a re-determined satellite signal strength and a corresponding previously-determined satellite signal strength. Alternatively, each base station of the plurality may be configured to broadcast its satellite signal strength periodically, or may broadcast its satellite signal strength in response to detecting a change. Therefore, the method may also involve performing the comparison responsive to determining that there is at least a threshold difference between at least one of the re-determined satellite signal strengths and the corresponding previously-determined satellite signal strength.

At block 54, based at least in part on the comparison, the base station may select one of the plurality of base stations to provide timing information. In practice, for instance, the base station may select the one base station that has the greatest satellite signal strength, and provide a request for timing information from the selected base station. In turn, the selected base station may provide its satellite data. Thus, the base station may process the satellite data from the selected base station to determine the timing information. Alternatively, the selected base station may process the satellite data and provide the timing information to the base station.

In line with the discussion above, the method may also involve receiving configuration data identifying a particular one of the plurality of base stations as the selected base station. For instance, a user of the base station may select the particular base station for provision of the timing information regardless of the outcome of the comparison, and identify the selection in the configuration data. Or, for instance, the configuration data may identify a group of preferred base stations within the plurality of base stations, and the base station may select a particular base station from within the group.

Further, in line with the discussion above, the method may involve identifying a given base station having the greatest satellite signal strength, determining that the identified base station is a second base station other than the base station, determining quality of connectivity between the base station and the identified base station, and determining the timing information based on satellite data from: (i) the identified base station if the quality is greater than a threshold, or (ii) another base station of the plurality of base stations if the quality is less than the threshold. The base station may evaluate the quality of the connectivity using any metric such as data stream quality, ping, jitter, LAN connectivity, or any other quality metric. Therefore, on one hand, if the quality is less than the threshold, the base station may utilize timing information based on its own SPS receiver or from another base station of the plurality of base stations. On the other hand, if the quality is greater than the threshold, the base station may utilize the timing information of the identified base station having the greatest satellite signal strength.

Still further, in line with the discussion above, the method may involve determining that the identified base station having the greatest satellite signal strength is the base station itself. In this case, the method may also involve sending a message to one or more other base stations of the plurality of base stations. The message may identify the base station for provision of the timing information. Subsequent to sending the message, for instance, the method may also involve providing one or more data streams to the one or more other base stations that include satellite data from an SPS receiver of the first base station (or timing information computed based on the satellite data). In this instance, the one or more other base stations may operate using timing information from the base station that has the greatest satellite signal strength.

At block 56, the base station operates according to the timing information indicated by a satellite-positioning-system receiver of the selected base station. For instance, in the arrangement of FIG. 1, if the base station 26 is the selected base station, the base station 24 may synchronize its communication with the RAN 12 using the timing information indicated by the satellite data from the base station 26. Further, in in line with the discussion above, the base station may also operate according to geographic location information indicated by the satellite-positioning-system receiver of the selected base station.

Figure 3:
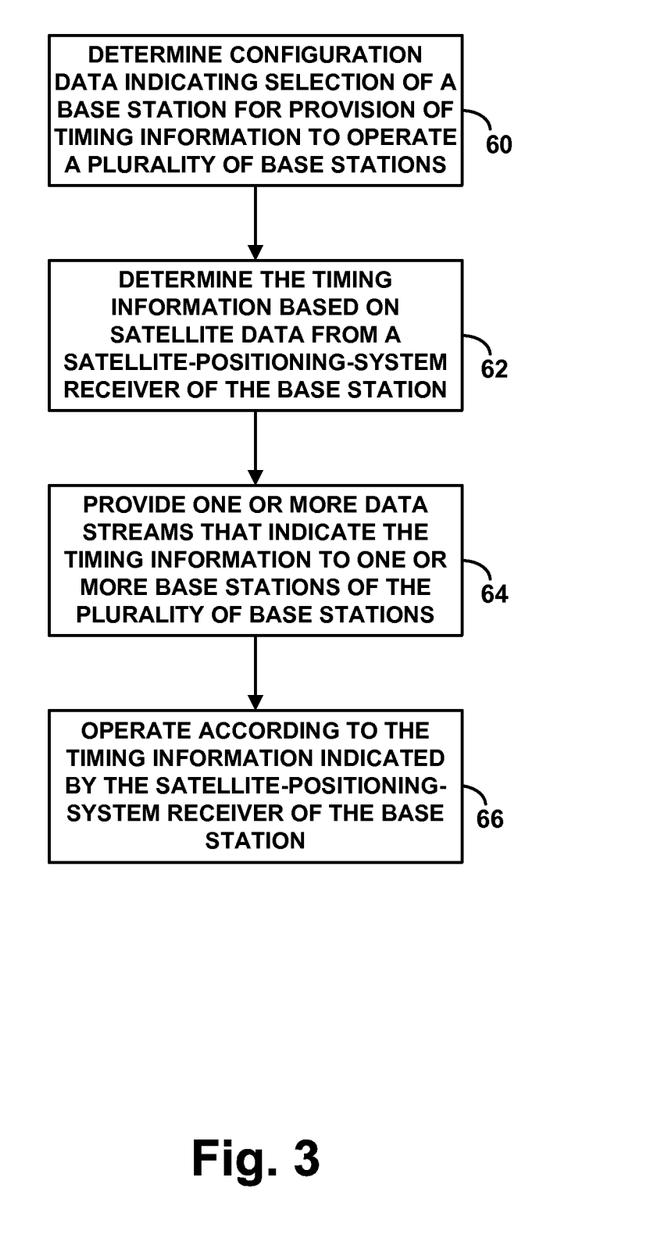
FIG. 3 is another flow chart depicting functions that can be carried out in accordance with the disclosure.

FIG. 3 is another flow chart depicting example functions that can be carried out in accordance with the present disclosure by a base station, such as the base station 24 or another base station, to help improve accuracy and reliability of timing information or location information utilized by a group of base stations. As with the functions of FIG. 2, certain functions of FIG. 3 may be carried out concurrently with each other or in another order.

As shown in FIG. 3, at block 60, the method involves the base station determining configuration data indicating selection of the base station for provision of timing information to operate a plurality of base stations. In practice, for instance, one of the plurality of base stations may perform a comparison of satellite signal strengths of the plurality of base stations (including the base station) to select the base station for provision of the timing information, and may thereby provide the configuration data to the base station (e.g., provide a message to the base station requesting the provision of the timing information). Each satellite signal strength may be measured at a respective satellite-positioning-system (SPS) receiver of a respective one of the plurality of base stations. Thus, for instance, the selection may be based on the base station having the greatest satellite signal strength, or may be based on other criteria as well (e.g., quality of connectivity between the base station and the plurality of base stations). Accordingly, in line with the discussion above, determining the configuration data may comprise receiving, from one of the plurality of base stations, a message indicating the selection of the base station for provision of the timing information. Alternatively, for instance, the configuration data may be included in a memory accessible by the base station, and the configuration data may include the selection (e.g., by a user of the base station).

In instances where the method involves receiving the message indicating the selection of the base station, the method may optionally involve the base station providing an indication of the satellite signal strength at the base station to one or more of the plurality of base stations, and in response, the base station receiving the message indicating the selection of the base station. Thus the comparison of the satellite signal strengths by the one or more base stations may, in some instances, include the satellite signal strength of the base station.

At block 62, the method then involves the base station determining the timing information based on satellite data from a satellite-positioning-system (SPS) receiver of the base station. This function may be largely the same as that discussed above, involving programmatically computing the timing information using satellite signals from overhead satellites. For instance, the SPS receiver may be a Global Positioning System (GPS) receiver, or any other satellite-based navigation system receiver that receives the satellite signals.

At block 64, the method involves the base station providing one or more data streams that indicate the timing information to one or more base stations of the plurality of base stations. Optimally, in some instances, the plurality of base stations may be connected to one another via a local area network (LAN). Thus, for instance, the base station may establish the one or more data streams over the LAN to provide the timing information determined at block 62 to the plurality of base stations, or to provide the satellite data from the SPS receiver of the base station to the plurality of base stations. In turn, the plurality of base stations may operate based on the timing information from the base station that was selected to provide the timing information.

However, in some instances, a quality of connectivity between the base station some of the other base stations in the plurality of base stations may be less than a threshold. For instance, LAN connectivity of some of the base stations may lag, or may experience jitters, etc. Thus, in line with the discussion above, the method may also involve identifying, from within the plurality of base stations, the one or more base stations having a quality of connectivity with the base station that is greater than a threshold. In turn, for instance, the one or more data streams may reliably provide the timing information to the identified one or more base stations. Other base stations having the quality of connectivity with the base station less than the threshold may utilize, for instance, their own SPS receiver to compute timing information or may select another base station of the plurality of base stations for provision of the timing information among other possibilities.

At block 66, the method involves the base station operating according to the timing information indicated by the satellite-positioning-system receiver of the base station. Thus, for instance, since the base station was selected to provide its timing information to the plurality of base stations, the base station may also operate according to its own timing information.

Figure 4:
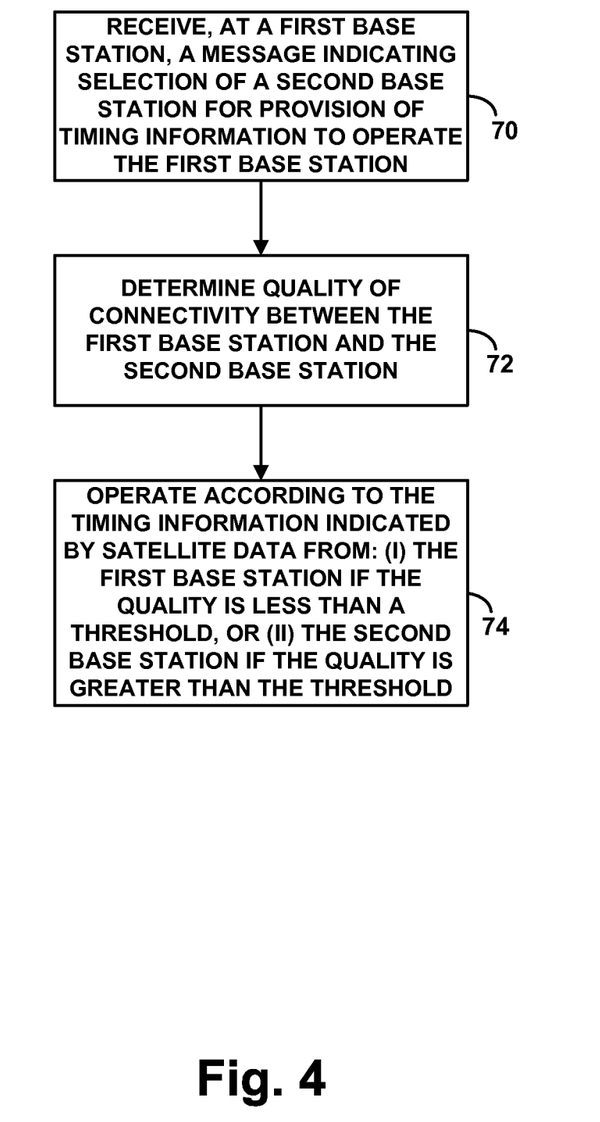
FIG. 4 is yet another flow chart depicting functions that can be carried out in accordance with the disclosure.

FIG. 4 is yet another flow chart depicting example functions that can be carried out in accordance with the present disclosure by a base station, such as the base station 25 or another base station, to help improve accuracy and reliability of timing information or location information utilized by a group of base stations. As with the functions of FIGS. 2 and 3, certain functions of FIG. 4 may be carried out concurrently with each other or in another order.

As shown in FIG. 4, at block 70, a first base station receives a message indicating selection of a second base station for provision of timing information to operate the first base station. As in the discussion above, the selection may be based on a comparison of satellite signal strengths of a plurality of base stations, and each satellite signal strength may be measured at a respective satellite-positioning-system receiver of a respective one of the plurality of base stations. In practice, the comparison may be performed by any of the plurality of base stations, and the base station that performs the comparison may provide the message to the first base station. Further, for instance, the selection may be based on the second base station having the greatest satellite signal strength.

In line with the discussion above, the method may also involve the first base station providing an indication of a satellite signal strength at the first base station to one or more of the plurality of base stations. In turn, for instance, the one or more of the plurality of base stations may perform the comparison to determine the selection of the second base station, and thereby provide the message to the first base station indicating the selection of the second base station for provision of the timing information.

At block 72, the first base station then determines quality of connectivity between the first base station and the second base station. Optimally, for instance, the plurality of base stations may be connected to one another via a local area network (LAN), and thus the first base station may determine a ping or other quality of connectivity metric with the second base station.

In line with the discussion above, for instance, responsive to receiving the message at block 70, the method may then involve the first base station sending a request to the second base station for initiating a data stream that includes satellite data from a satellite-positioning-system receiver of the second base station (or timing information computed based on the satellite data). In this case, the method may also involve the first base station responsively receiving the data stream from the second base station. Thus, at block 72 for instance, the first base station may determine the quality of connectivity (e.g., jitter, ping, lag, etc.) that is associated with the received data stream.

At block 74, the first base station then operates according to the timing information indicated by satellite data from: (i) the first base station if the quality is less than a threshold, or (ii) the second base station if the quality is greater than the threshold. For instance, if the first base station deems that the quality of the connectivity with the second base station is unsuitable for reliable streaming of the satellite data from the second base station, the first base station may utilize its own satellite data to determine the timing information. On the other hand, if the connection is reliable, the first base station may receive the satellite data from the second base station, or may receive the timing information from the second base station.

Figure 5:
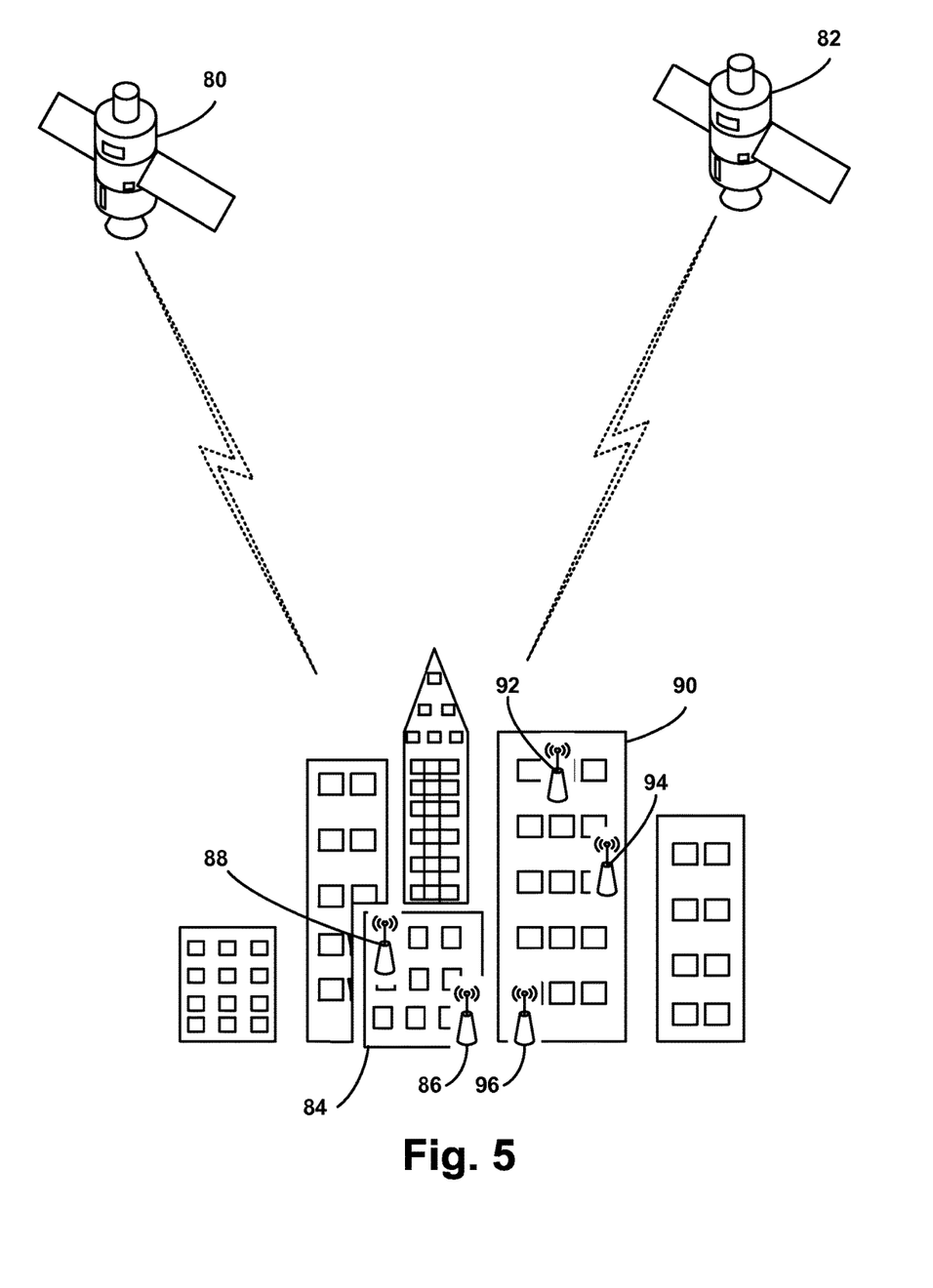
FIG. 5 is an illustrative representation of a deployment configuration in which nearby base stations have different satellite signal strengths in accordance with the disclosure.

FIG. 5 is an illustrative representation of a deployment configuration in which nearby base stations have different satellite signal strengths in accordance with the disclosure. As shown in FIG. 5, SPS satellites 80, 82 provide SPS satellite signals that may be utilized to compute location and timing information by various devices on the ground. Building 84 includes base stations 86, 88 that may be similar to base stations 24, 26, 28 of FIG. 1. Similarly, building 90 includes base stations 92, 94, 96 deployed in various locations in the building 90. Other arrangements may include additional SPS satellites and/or base stations.

The SPS satellites 80, 82 may include any navigational system satellites such as Global Positioning System (GPS) satellites, Global Navigation Satellite System (GLONASS) satellites, Galileo positioning system satellites, Regional Navigation Satellite System satellites, Beidou Navigation Satellite System satellites, or any other SPS satellites currently developed or later developed.

As shown in FIG. 5, the base stations 86, 88 are deployed in building 84. Optimally, the base stations 86, 88 may be femtocells or other type of base stations that provide coverage for a cellular wireless network such that of FIG. 1. Similarly, the base stations 92, 94, 96 are deployed in the building 90. In practice, a group of base stations, such as those in a building, may be connected to one another via a network router (not shown) of a local area network (LAN). For instance, in the arrangement of FIG. 5, the base stations 84, 86 may be connected to one another in a LAN, and the base stations 92, 94, 96 may be connected to one another in another LAN.

In line with the discussion above, a group of base stations in a LAN may utilize the SPS satellite signals from the SPS satellites 80, 82 to compute their timing information or location information, and thereby facilitate various operations of the base stations. Yet, each base station may have different satellite signal strengths due to different deployments of the base stations. The present method advantageously allows efficient sharing of satellite data from a base station having a greater satellite signal strength to another base station having a lower satellite signal strength.

In one example scenario of the arrangement in FIG. 5, the base station 88 is deployed at a higher level of the building 84 than the base station 86, and therefore may have a greater satellite signal strength than the base station 86. The base station 86 may perform the method of the present disclosure to compare the satellite signal strengths of base stations in its LAN (i.e., the base stations 86, 88), and thereby select the base station 88 for provision of timing information or location information. For instance, the base station 86 may send a request to base station 88 for its satellite data or timing information computed based on its satellite data, and may utilize this information to operate the base station 86.

In another example scenario, the base stations 92, 94, 96 operating in the LAN of building 90 may also have different satellite signal strengths. As shown in FIG. 5, base station 92 is deployed near the top of the building 90, base station 94 is deployed at a slightly lower level, and base station 96 is deployed near the ground level of building 90. In turn, the base station 92 may have an excellent satellite signal strength, the base station 94 may have an average satellite signal strength, and the base station 96 may have a low satellite signal strength. Thus, in this scenario, the base station 96 may perform the present method to compare satellite signal strengths of the base stations 92, 94, 96, select base station 92 for provision of timing information, and operate based on the timing information from the SPS receiver of base station 92. Further, the base station 96 may inform the base station 94 of the results of the comparison, and the base station 94 may then engage in signaling with the base station 92 to also operate based on the timing information from the base station 92.

Further, in the example above, the present method may be enhanced in line with the discussion above to select a base station for provision of the timing information (or location information) not only based on the comparison of satellite signal strengths but also based on other criteria. Continuing with the example above, the base station 96 may detect that a quality of connectivity between the base station 96 and the base station 92 is less than a particular threshold. For instance, delays in the LAN of building 90 or other network traffic may affect the quality of connectivity between base stations 92, 96. In this case, the base station 96 may instead utilize satellite data from the base station 94 as the source for its timing information (or location information).

Still further, in the example above, the present method may be enhanced to dynamically adjust selection of the base station providing the timing information according to changing conditions of the selected base station. Continuing with the example above, in one instance, a window cleaning crew may temporarily interfere with the line-of-sight between the base station 92 and the SPS satellites 80, 82. In another instance, quality of connectivity between the base stations 92, 96 may change due to varying network traffic or other LAN connectivity issues. In these instances and other similar instances, the base station 96 may instead establish a data stream with the base station 94 to receive the satellite data (or timing information) from the SPS receiver of the base station 94. In practice, the base station 96 may detect the change in satellite signal strength of the base station 92. For instance, the base stations 92, 94 may be configured to periodically broadcast their respective satellite signal strengths to the base station 96, and the base station 96 may then periodically re-compare the satellite signal strengths. Alternatively, the base stations 92, 94 may be configured to detect the change in their respective satellite signal strengths, and responsively broadcast the updated satellite signal strength to the base station 96. Advantageously, the base station 96 may dynamically update the selected base station according to changing conditions, and thereby improve accuracy and reliability of its timing information (or location information).

In yet another example scenario, a base station may utilize satellite data from another base station that is not included in its LAN. In the arrangement of FIG. 5 by way of example, the base station 92 may have an even greater satellite signal strength than the base station 86 because of its deployment in building 90 at a higher altitude with a better line-of-site to the SPS satellites 80, 82. Further, in the scenario, the base station 96 may receive a data stream from the base station 92 that includes the satellite data from the base station 92. In this scenario, the base station 86 may detect the base station 96 being nearby even if the base stations 86, 96 are not in the same LAN, for instance, by using a wireless communication interface (e.g., WiFi, Bluetooth, etc.) in the base station 86. In turn, the base station 86 may establish another data stream with the base station 96 to receive the satellite data (or timing information, etc.) associated with the greater satellite signal strength (i.e., the satellite data from the base station 92), and thereby further improve the accuracy and reliability of the timing information (or location information) utilized by the base station 86.

Other scenarios are possible as well. For instance, some of the base stations in FIG. 5 may not include their own SPS receiver, and may thereby perform the present method to receive timing information (or location information) for their operation from another base station that includes an SPS receiver.

Figure 6:
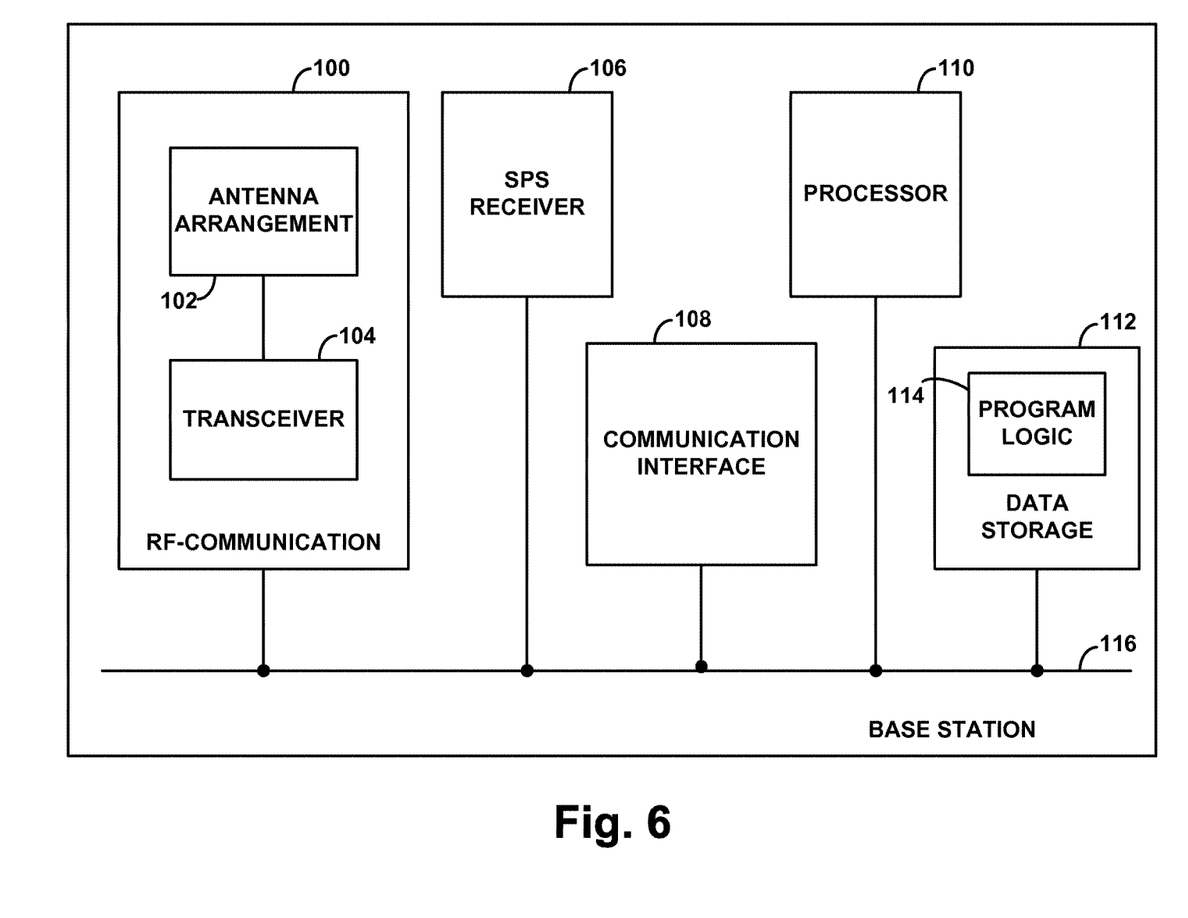
FIG. 6 is a block diagram of an example base station operable within the system of FIG. 1.

FIG. 6 is a block diagram of an example base station operable within the system of FIG. 1. As shown, the base station includes for each of its one or more coverage areas a radio frequency (RF) communication block 100 that includes a respective antenna arrangement 102 and transceiver 104. The base station also includes an SPS receiver 106, a communication interface 108, a processor 110, and non-transitory data storage 112 that includes program logic 114. All these components may be communicatively linked together by a system bus, network, or other connection mechanism 116.

The antenna arrangement 102 may include one or more antennas arranged in a manner now known or later developed for radiating to define a wireless coverage area. The antenna arrangement would be mounted at the top of an antenna tower or could be provided in some other manner, such as in a femtocell arrangement for instance. The transceiver 104, in turn, may comprise a power amplifier, a modem chipset, channel cards, and other circuitry for sending and receiving communications via the antenna arrangement 102 in accordance with an agreed air interface protocol.

The SPS receiver 106 may include any satellite-positioning-system receiver such as a GPS receiver or the like. In practice, the SPS receiver 106 may receive satellite signals from overhead satellites such as SPS satellites 80, 82, and the base station may utilize satellite data from the SPS receiver 106 to compute timing information or location information of the base station. Alternatively, in line with the discussion above, the base station may perform the functions described herein to receive satellite data (or timing information, etc.) from the SPS receiver of another base station (not shown).

The communication interface 108 may comprise a mechanism for communicatively linking the base station with the control node 16 or with one or more other base stations, such as to facilitate communication of control signaling between the base station and the control node, or signaling between the base station and the other base stations. For instance, under the LTE protocol, communication interface may facilitate signaling with the control node 16 over an S1 interface and/or with other base stations over an X2 interface. As such, the communication interface may be an Ethernet interface or the like, facilitating packet-switched network communications. Alternatively or additionally, the communication interface 108 may comprise other mechanisms for communicatively linking the base station with other base stations in a local area network (LAN). For instance, the communication interface may connect to a network router (not shown) in the LAN to facilitate signaling with other base station in the LAN. As such, the communication interface may be an Ethernet interface or a wireless interface (e.g., WiFi), facilitating packet-switched network communications. And the communication interface 108 may alternatively or additionally comprise yet other mechanisms for communicatively linking the base station with other base stations that are not in a LAN. For instance, the communication interface may connect directly to other nearby base stations via a wireless (e.g., Bluetooth, WiFi) or wired (e.g., Ethernet, etc.) connection.

The processor 110 may include one or more general purpose processors and/or one or more special purpose processors (e.g., dedicated digital signal processors or application specific integrated circuits) and may be integrated in whole or in part with the transceiver 104 or with other aspects of the base station. And the data storage 112 may include one or more volatile and/or non-volatile storage components, such as magnetic, optical, or flash storage components, which can be integrated in whole or in part with the processor 110. As shown, the data storage 112 may contain program logic 114 that can be executed by the processor 110 to carry out various base station functions described herein, such as the functions described above with respect to FIGS. 2, 3, and 4.

Exemplary embodiments have been described above. Those skilled in the art will understand, however, that changes and modifications may be made to these embodiments without departing from the true scope and spirit of the invention.

We claim:

1. A method comprising:
    determining, by a first base station of a plurality of base stations, that the plurality of base stations are proximally located with respect to one another;
    determining, by the first base station, respective satellite signal strengths of the plurality of base stations, wherein each satellite signal strength is measured at a satellite-positioning-system receiver of a respective one of the plurality of base stations;
    performing, by the first base station, a comparison of the satellite signal strengths of the plurality of base stations;
    based at least in part on the comparison and the determination that the plurality of base stations are proximally located with respect to one another, selecting one of the plurality of base stations to provide timing information; and
    operating, by the first base station, according to the timing information indicated by the satellite-positioning-system receiver of the selected base station.

2. The method of claim 1, wherein the plurality of base stations are femtocells that are connected to one another via a local area network (LAN).

3. The method of claim 1, wherein selecting one of the plurality of base stations to provide the timing information comprises receiving configuration data identifying a particular one of the plurality of base stations as the selected base station.

4. The method of claim 1, wherein selecting one of the plurality of base stations to provide the timing information comprises identifying a particular one of the plurality of base stations having the greatest satellite signal strength.

5. The method of claim 4, wherein the plurality of base stations comprise at least the first base station and a second base station, the method further comprising:
    determining that the identified base station is the second base station;
    determining quality of connectivity between the first base station and the second base station; and
    determining the timing information based on satellite data from: (i) the second base station if the quality is greater than a threshold, or (ii) another base station of the plurality of base stations if the quality is less than the threshold.

6. The method of claim 4, further comprising:
    determining that the identified base station is the first base station;
    sending, to one or more other base stations of the plurality of base stations, a message that identifies the first base station for provision of the timing information; and
    subsequent to sending the message, providing, to the one or more other base stations, one or more data streams that include satellite data from a satellite-positioning-system receiver of the first base station.

7. The method of claim 1, further comprising:
    determining a satellite signal strength of the first base station; and receiving an indication of one or more other satellite signal strengths of one or more other base stations of the plurality of base stations, wherein the satellite signal strengths in the comparison include the satellite signal strength and the one or more other satellite signal strengths.

8. The method of claim 7, wherein determining that the plurality of base stations are proximally located with respect to one another comprises:
receiving, from a network router connected to the first base station, a listing of the one or more other base stations, wherein the one or more other base stations are also connected to the network router; and
based on the listing, sending, to the one or more other base stations, a request for the indication of the one or more other satellite signal strengths, wherein receiving the indication is responsive to sending the request.

9. The method of claim 7, wherein determining that the plurality of base stations are proximally located with respect to one another comprises:
detecting, via a wireless communication interface included in the first base station, the one or more other base stations; and
responsive to detecting the one or more other base stations, sending, to the one or more other base stations, a request for the indication of the one or more other satellite signal strengths, wherein receiving the indication is responsive to sending the request.

10. The method of claim 1, further comprising, periodically:
re-determining the satellite signal strengths; and
determining whether or not there is a difference between at least one of the re-determined satellite signal strengths and a corresponding previously-determined satellite signal strength, wherein the performing the comparison is responsive to determining that there is a difference between at least one of the re-determined satellite signal strengths and the corresponding previously-determined satellite signal strength.

11. The method of claim 10, wherein the performing the comparison is responsive to determining that there is at least a threshold difference between at least one of the re-determined satellite signal strengths and the corresponding previously-determined satellite signal strength.

12. The method of claim 1, further comprising:
operating, by the first base station, according to geographic location information indicated by the satellite-positioning-system receiver of the selected base station.

13. A method comprising:
at a first base station of a plurality of base stations, determining configuration data indicating selection of the first base station for provision of timing information to operate the plurality of base stations, wherein the selection is based on a comparison of satellite signal strengths of the plurality of base stations and a determination that the plurality of base stations are proximally located with respect to one another, and wherein each satellite signal strength is measured at a respective satellite-positioning-system receiver of a respective one of the plurality of base stations;
determining the timing information based on satellite data from a satellite-positioning-system receiver of the first base station;
providing, to one or more base stations of the plurality of base stations, one or more data streams that indicate the timing information; and
operating, by the first base station, according to the timing information indicated by the satellite-positioning-system receiver of the first base station.

14. The method of claim 13, wherein determining the configuration data comprises receiving, from one of the plurality of base stations, a message indicating the selection of the first base station for provision of the timing information.

15. The method of claim 14, further comprising:
providing an indication of a satellite signal strength at the first base station to one or more of the plurality of base stations, wherein receiving the message is responsive to providing the indication.

16. The method of claim 13, further comprising:
identifying, from within the plurality of base stations, the one or more base stations having a quality of connectivity with the first base station that is greater than a threshold, wherein providing the one or more data streams is responsive to identifying the one or more base stations.

17. A method comprising:
at a first base station, receiving a message indicating selection of a second base station for provision of timing information to operate the first base station, wherein the selection is based on a comparison of satellite signal strengths of a plurality of base stations and a determination that the plurality of base stations are proximally located with respect to one another, and wherein each satellite signal strength is measured at a respective satellite-positioning-system receiver of a respective one of the plurality of base stations;
determining quality of connectivity between the first base station and the second base station; and
operating, by the first base station, according to the timing information indicated by satellite data from: (i) the first base station if the quality is less than a threshold, or (ii) the second base station if the quality is greater than the threshold.

18. The method of claim 17, further comprising:
responsive to receiving the message, sending a request to the second base station for initiating a data stream that includes the satellite data from a satellite-positioning-system receiver of the second base station; and
responsively receiving the data stream from the second base station.

19. The method of claim 17, further comprising:
providing an indication of a satellite signal strength at the first base station to one or more of the plurality of base stations, wherein receiving the message is responsive to providing the indication.

20. The method of claim 17, wherein the selection is based on the second base station having the greatest satellite signal strength.

* * * * *